(12) United States Patent
De Rozairo

(10) Patent No.: US 11,935,348 B2
(45) Date of Patent: Mar. 19, 2024

(54) SYSTEM AND METHOD FOR BIOMETRIC ACCESS CONTROL

(71) Applicant: VALIDVOICE, LLC, Omaha, NE (US)

(72) Inventor: Damian De Rozairo, Omaha, NE (US)

(73) Assignee: VALIDVOICE, LLC, Omaha, NE (US)

( * ) Notice: Subject to any disclaimer, the term of this patent is extended or adjusted under 35 U.S.C. 154(b) by 465 days.

(21) Appl. No.: 17/262,634

(22) PCT Filed: Jul. 23, 2019

(86) PCT No.: PCT/US2019/042939
§ 371 (c)(1),
(2) Date: Jan. 22, 2021

(87) PCT Pub. No.: WO2020/023448
PCT Pub. Date: Jan. 30, 2020

(65) Prior Publication Data
US 2021/0358243 A1    Nov. 18, 2021

Related U.S. Application Data

(60) Provisional application No. 62/702,452, filed on Jul. 24, 2018.

(51) Int. Cl.
*G07C 9/25*         (2020.01)
*G06F 21/32*        (2013.01)
(Continued)

(52) U.S. Cl.
CPC .............. *G07C 9/257* (2020.01); *G06F 21/32* (2013.01); *G06F 21/34* (2013.01); *G06F 21/36* (2013.01);
(Continued)

(58) Field of Classification Search
CPC ...... G07C 9/257; G07C 9/23; G07C 9/00309; G07C 9/00563; G07C 9/00571;
(Continued)

(56) References Cited

U.S. PATENT DOCUMENTS

| 7,174,323 B1 | 2/2007 | Schultz et al. |
| 2003/0163739 A1* | 8/2003 | Armington ........... H04L 9/3226 713/186 |

(Continued)

FOREIGN PATENT DOCUMENTS

| EP | 3827420 | 6/2021 |
| IN | 202137007723 A | 3/2021 |

(Continued)

OTHER PUBLICATIONS

"Extended European Search Report for European Application No. 19841543.2, Search completed Mar. 25, 2022, dated Apr. 7, 2022, 8 Pgs".

(Continued)

*Primary Examiner* — Abiy Getachew
(74) *Attorney, Agent, or Firm* — Smith, Gambrell & Russell, LLP; Judy Jarecki-Black

(57) ABSTRACT

A process for granting or denying a user access to a system using biometrics is disclosed. The process includes receiving a unique identifier for the system, receiving a unique identifier associated with the user, and verifying that the user is authorized to access the system. A passcode is transmitted to the device in the possession of the user, and a speech sample of the user speaking the passcode is returned. One or more attributes of the speech sample is compared with one or more attributes that are expected to be in a speech sample. Access is granted or denied based upon a correlation between the file's actual attributes and the predicted attributes.

11 Claims, 2 Drawing Sheets

(51) Int. Cl.
  *G06F 21/34* (2013.01)
  *G06F 21/36* (2013.01)
  *G07C 9/23* (2020.01)
(52) U.S. Cl.
  CPC ........ *G07C 9/23* (2020.01); *G06F 2221/2137* (2013.01)
(58) Field of Classification Search
  CPC ............ G07C 9/27; G07C 2009/00396; G07C 2209/08; G07C 9/25; G06F 21/32; G06F 21/34; G06F 21/36; G06F 2221/2137; G10L 17/24
  See application file for complete search history.

(56) References Cited

U.S. PATENT DOCUMENTS

| | | | |
|---|---|---|---|
| 2004/0220798 A1* | 11/2004 | Chi | ........................ G10L 17/22 704/E17.015 |
| 2007/0055517 A1 | 3/2007 | Spector | |
| 2013/0132091 A1 | 5/2013 | Skerpac | |
| 2015/0220718 A1 | 8/2015 | Hong et al. | |
| 2017/0365259 A1* | 12/2017 | Zheng | ...................... G10L 17/02 |
| 2022/0310100 A1* | 9/2022 | Saund | ...................... G06F 21/43 |

FOREIGN PATENT DOCUMENTS

| | | |
|---|---|---|
| KR | 1020150146061 A | 12/2015 |
| KR | 1020160098904 A | 8/2016 |
| WO | 2014123663 A1 | 8/2014 |
| WO | 2018048956 A1 | 3/2018 |
| WO | 2020023448 A1 | 1/2020 |

OTHER PUBLICATIONS

"International Preliminary Report on Patentability for International Application PCT/US2019/042939, Report issued Jan. 26, 2021, dated Feb. 4, 2021."
International Search Report and Written Opinion for PCT/US2019/042939, dated Oct. 31, 2019.
"First Examination Report Received for India Patent Application No. 202137007723, dated Oct. 20, 2022."

* cited by examiner

SYSTEM AND METHOD FOR BIOMETRIC ACCESS CONTROL

CROSS-REFERENCE TO RELATED APPLICATIONS

This is the United States National Stage of Patent Cooperation Treaty Application No. PCT/US2019/042939, filed Jul. 23, 2019, which claims priority to U.S. Provisional Patent Application No. 62/702,452, filed Jul. 24, 2018, the disclosures of which are incorporated herein by reference in their entireties.

BACKGROUND

The present disclosure is generally related to systems and methods used to verify a user's identity and grant access to a secured system. More specifically, the present invention relates to systems and methods for granting physical and/or logical access to secured systems including physical facilities and/or computer systems. Even more specifically, the present invention relates to systems and methods utilizing a biometric parameter which includes voice recognition to grant access.

Prior systems and methods for utilizing voice recognition have relied upon predetermined pass phrases to be spoken into a device with the entry of a personal identification number, username, or other designation of the user. The device may record and transmit the spoken passphrase to an engine for comparing it to a reference for the individual associated with the reference file. If the transmitted passphrase and reference file match to a sufficient degree, access would be granted to the person entering the user designation and providing the passphrase.

However, such systems include inherent security weaknesses. For example, the use of a static passphrase can make the system susceptible to spoofing by means of prerecorded audio of a user speaking the passphrase. Additionally, while a user designation may be required, the entry of such a designation only serves to verify the person attempting entry has the designation, not that they are, in fact, the user associated with the user designation.

Other systems that do not rely on biometrics may employ two-factor authentication. Such systems may utilize a mobile application on a user's phone. When the user seeks access to a secure system at a point of access (such as a terminal, website, VPN login, or physical access control) the access system may send a request to the mobile application to authenticate the access request. For example, a user may enter credentials into a login prompt to enable access to a corporate VPN. Prior to granting access, the system may require the user to respond, within a limited period of time, to a prompt on the user's phone acknowledging the login attempt. However, while this provides some enhanced security, the second of the two-factors used for authentication, namely the acknowledgement from the phone, only serves to demonstrate the person attempting to gain access either has the user's phone, or a device configured to spoof it.

Accordingly, there is a need for systems and methods of using biometric access controls that permit two-factor authentication. There is a further need for systems and methods configured to facilitate the use of dynamic passcodes that reduce the likelihood of spoofing a user's voice.

DETAILED DESCRIPTION

Figure 1:
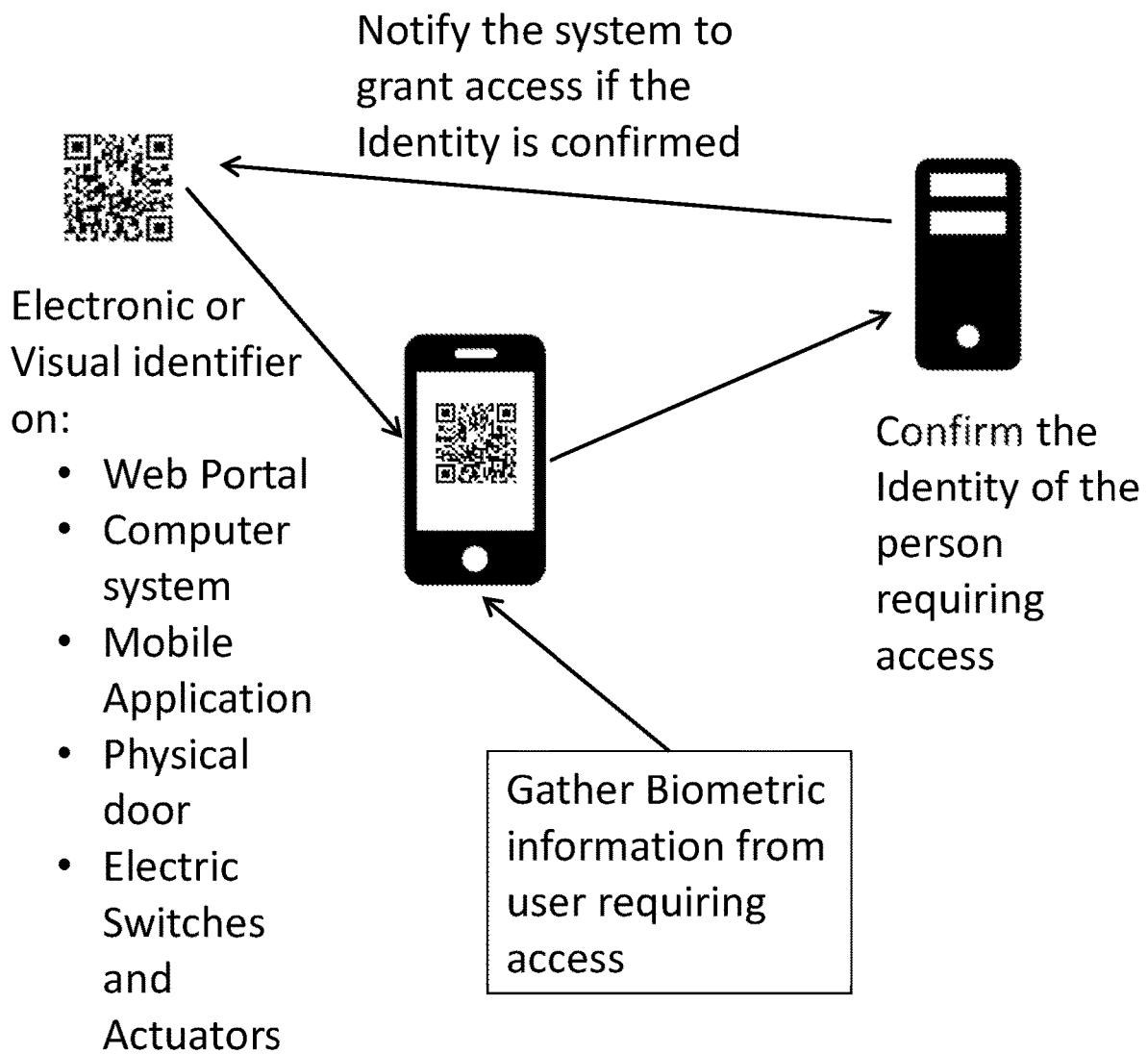
FIG. 1 is a schematic view of a system for utilizing biometrics for access controls.

In general, the systems and methods disclosed provide for secure access to secure systems without the use of a User ID & Password or any user-maintained physical access control devices such as keys, key fobs, software and hardware tokens, or proximity cards. As used herein, "secure systems" may refer to nearly any physically or logically restricted area or computer system. These may include web portals, mobile phone applications, computer systems including work stations and networks, physical doors, electric switches and actuators, or any system with a logical or physical lock. For purposes of this disclosure, "lock" may refer to any such access control, such as a physical lock or logical authentication process, and an "access point" may refer to the location, either physical or virtual, where the user provides information for authentication. Access points may be doors, control panels, web portals, network workstations, laptops, or any other such location.

In general, the user requesting access to the specific system(s), may use a mobile device to authenticate themselves and gain access. Alternatively, a web based or other application could be used, and are generally included in the term "application" as it is used herein. In some embodiments, the user may be associated with a user designation such as a phone number, username, or other designation. The application may prompt for entry of the designation by keyed entry or spoken voice. Alternatively, the user designation may be assumed from the identity of the device, such as a mobile phone, or from the credentials used to log into the application.

The authentication system may use an electronic or visual identifier to link the secure system being accessed with the application. This may include a barcode or other designator located at the physical location or displayed at other such access point. In some cases, the designator may be a static code. In other embodiments, the designator may be generated as a rolling code so that either physical presence at the access point, or live scanning of the designator is required by the user. This would aid in preventing a user from remotely unlocking an access point. In the case of a mobile app, a phones camera may be utilized to scan the designation and communicate to the authentication system to begin the process of authentication. Alternatively, the access point may have a numerical or other designation that may be entered into the application by the user at the access point. In other embodiments, a physical access point may have a proximity sensor, such as and RFID, Bluetooth, or other communication device that transmits or broadcasts its designation to mobile devices being used to gain access.

In some embodiments, an access terminal may be provided at a physical access point through which the user can interact with the authentication system to gain access. At such a terminal, the user may be prompted for a user designation which is transmitted to the authentication system with an access point designation.

As a first measure, the authentication system may review the access controls in place to determine if the user logged into the mobile application, associated with the user designation entered, or otherwise associated with the access request has sufficient permissions to access the secure system at the time of the request and at the access point. If the associated user permissions are not sufficient, access may be denied with no further steps. Such a method streamlines denials of access.

Once the authentication system has identified the secure system to be accessed and the user associated with the access request (and in some embodiments verified permissions), the authentication system may then present a login prompt on the computer, phone or mobile device through the application. Since the user seeking access is already associated with the access request by means of being logged into an application, entering their designation into the application or at the access point, the authentication system need only prompt the user for authentication data. However, in some embodiments, it may be advantageous to also prompt the user for additional information.

In a typical embodiment, the application may prompt the user to speak a passphrase. To avoid spoofing by use of a prerecorded passphrase, the authentication system may randomly generate the passphrase to be spoken. In a preferred embodiment, the passphrase may be a random sequence of numbers. The sequence is displayed and the user allowed a limited amount of time to speak the sequence into the access point device, whether it is a web app, a mobile app, or within an access terminal.

The spoken passphrase is then transmitted to the authentication system. The authentication system utilizes one or more of any suitable validation procedures to determine if the speaker of the passphrase is the user associated with reference data. Such processes may include those disclosed in [Australia Patent #2007335251] the entire disclosure of which is incorporated herein by reference.

If the spoken passphrase is positively associated with the reference data, the user may be granted access or prompted for an additional piece of authentication data such as a password or other biometric data. If the speaker is not associated with the reference data to a sufficient confidence level, the user may be prompted to speak another passphrase for comparison, denied access, or some combination of the two.

EXEMPLARY EMBODIMENTS

Figure 2:
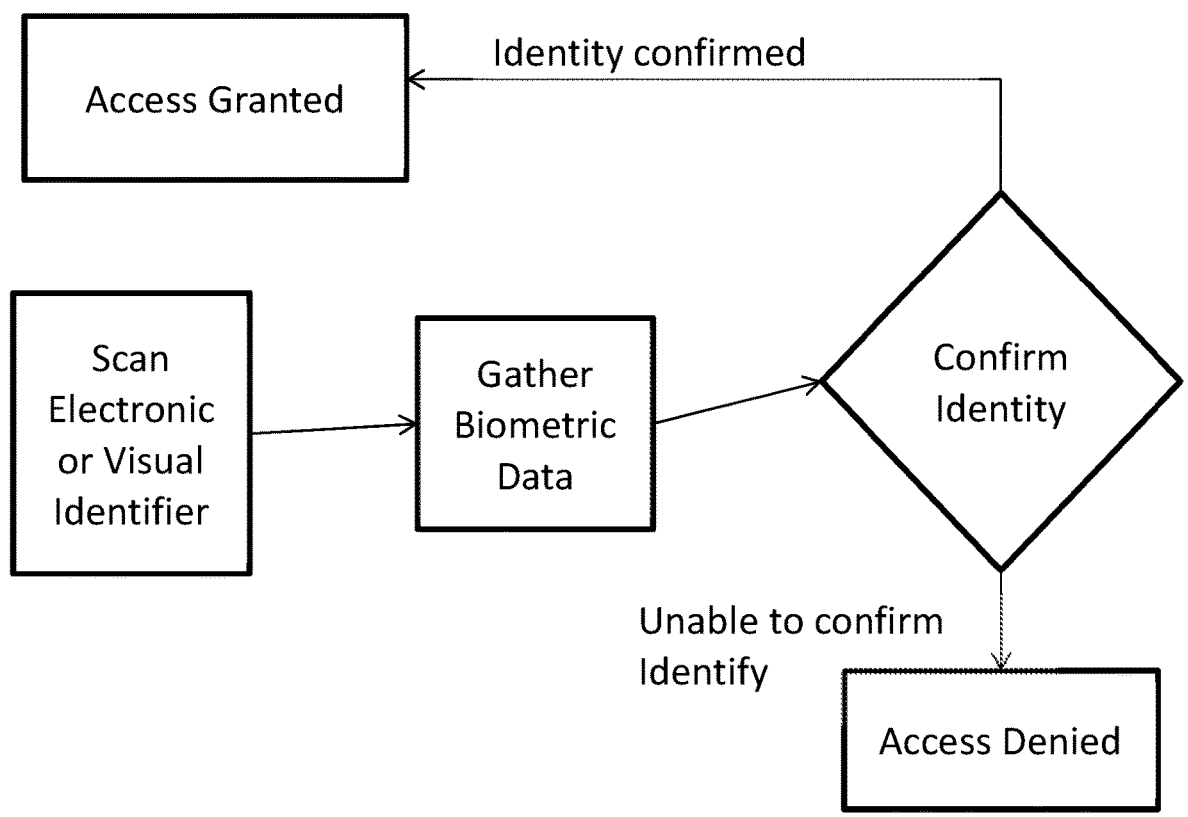
FIG. 2 is a process flow diagram for using biometrics for access controls.

As shown in FIGS. 1 and 2, an exemplary embodiment may utilize an identifier of the lock shown as a two dimensional barcode such as a QR code. To gain access to a web portal, for example, a user may visit the appropriate URL in a web browser. Upon landing on the portal page, a QR code or other designator is displayed. The user may then scan the designator with their mobile device through the mobile application.

At this point, the mobile application may communicate with the authentication system which may be housed on a central server separate from the network to which the access point is connected. At this point, the user's mobile device may communicate 1) the access point designator or some derivative thereof, and 2) a designation of the user logged into the mobile application. In some embodiments, both pieces of data could be transmitted in a single string or packet which may be tokenized. Based upon the identity of the access point and user profile, the authentication system may reference a database of permissions to determine if access may be attempted. Alternatively, the mobile application may immediately prompt the user for biometric data such as a generated string of numbers, letters, words, or other sounds to be spoken by the user and transmit such data with data identifying the user and access point.

After determining if the user possess sufficient access privileges the mobile application, the authentication server, or other agent may generate a string to be spoken by the user. The mobile application may then transmit the spoken string, or parts thereof, as may be necessary to validate the speaker to reference speech data tied to the user. If validated, the authentication system may communicate to the access point, or device networked with the access point, a confirmation that would allow the user access. A message may also be sent to the mobile application to provide an indication of whether or not validation was successful. The mobile application has two (2) specific functions: (1) an on-boarding process and (2) a verification process.

The on-boarding process gathers the initial voice biometric sample from the user and builds a unique biometric print for that user.

The verification process gathers a new voice biometric sample and matches that sample against the previously stored unique biometric print to confirm that the two samples belong to the same person. This in turn confirms the identity of the person.

In some embodiments, a mobile application may be the application used to obtain biometric data or other data required for authentication. The mobile application may have a built-in on-boarding process. In some embodiments, the mobile application has an open on-boarding process, where the consumer can on-board themselves. In other embodiments, such as a corporate application, once the user has been identified by a relevant security officer, the user is issued a token which he/she needs to input into the mobile application to unlock the on-boarding process.

During the on-boarding process, the mobile application may prompt the user with a series of questions and capture the user's speech samples. Once the required amount of speech is captured, the mobile application transmits the speech to a server to process the speech and build the user's biometric print. Once the biometric print is built, the server informs the mobile application that it should automatically run the user through a verification process to ensure the on-boarding process was successful. Once verified, the on-boarding process is confirmed and completed.

When the user requires access to an access point, the user uses the mobile application to scan an electronic or visual designator of the access point being accessed. Once the scan is complete, the mobile application prompts the user with a series of questions and captures the user's speech. This speech is then transmitted to the server for identity verification. Once the user's identify is verified, the server will notify the entity being accessed to grant access to the user.

In some embodiments, onboarding may be accomplished by means of an automated call center. In such embodiments, a call center may be provided access to data to verify the identity of a caller by a user's organization. Such data may include preselected challenge questions and answers, passwords, identification numbers, etc. When calling, the user may be prompted to enter or speak a string or code which will be used to identify the sponsor organization (such as an employer) and the user. The automated call center may then progress through a validation protocol to validate the identity of the call as the user being on-boarded. In some of these embodiments, the process may require spoken answers during the protocol and those spoken answers may be utilized in building the user's biometric reference print.

The mobile application may allow users to pair frequently accessed access points with their profile. Once the verification process is completed, the mobile application gives the user the option to name and pair the entity with the user's profile.

Once paired, the user can select the entity being accessed from a list of paired entities, without having to scan the electronic or visual identifiers on any subsequent request for access to that specific entity.

In some embodiments, user profiles may be agnostic to sponsor organization. This would permit individual users to create a profile which may be then granted access permissions by any sponsoring organization utilizing the system. This would be of particular benefit to service providers who provide services to multiple agencies. For example, a janitorial service contractor may need permissions for certain of its employees to access client facilities. In such instances, a user who is an employee of the janitorial service could create a profile to which the clients of the janitorial service would grant access permissions. Such a process would could also be used with access terminals at access points rather than a mobile application.

In some embodiments, a user may change his/her mobile application profile at any time. A user's mobile application profile can be loaded on to any mobile device of their choosing. This gives users the freedom to use as many mobile devices as they deem fit when using the mobile application. The user's identity is always verified before access to granted any entity to ensure that the correct person is provided access at all times.

What is claimed is:

1. A process for granting or denying a user access to a system using biometrics, the process comprising the steps of:
   receiving from a device in the possession of the user a unique identifier for the system;
   wherein the unique identifier for the system is displayed at or near an access point and the unique identifier for the system changes from time to time;
   receiving from the device in the possession of the user a unique identifier associated with the user;
   verifying that the user is authorized to access the system;
   transmitting a passcode to the device in the possession of the user;
   receiving from the device in the possession of the user a speech sample of the user speaking the passcode;
   comparing one or more attributes of the speech sample with one or more attributes that are expected to be in a speech sample generated on the device and dependent upon the user speaking the passcode;
   granting or denying the user access to the system based upon a correlation between the one or more attributes of the speech sample and the one or more expected attributes.

2. The process of claim 1, wherein the speech sample generated on the device and dependent upon the user speaking the passcode is an audio file, waveform, or mathematical representation generated based on the user's voice articulating the passcode.

3. The process of claim 1, wherein the passcode and/or phrase is generated after receiving the unique identifier for the system and the unique identifier for the user.

4. The process of claim 3, wherein the passcode and/or phrase is uniquely generated as part of a verification session.

5. The process of claim 1, wherein failure to receive the speech sample generated on the device and dependent upon the user speaking the passcode and/or phrase within a predetermined amount of time results in the user being denied access.

6. The process of claim 1, wherein the system comprises a terminal, website, VPN login, or physical access control point.

7. The process of claim 1, wherein the unique identifier for the system is provided in a barcode, in a URL, RFID or any digital identifier or by accessing a link on a webpage.

8. The process of claim 1, wherein the one or more attributes that are expected to be in the file are predicted from a unique biometric print for the user.

9. The process of claim 1, further comprising the step of prompting the user with a series of questions for the user to verbally answer and the system to record during an on-boarding process of a system mobile application on the device in the possession of the user.

10. The process of claim 9, further comprising the step of building a unique biometric print for the user from the recorded verbal answers to said series of questions.

11. The process of claim 10, further comprising the step of the mobile application running the user through a verification process after the unique biometric print for the user is built to ensure the on-boarding process was successful.

* * * * *